INVENTOR
NORMAN F. MOODY
BY Smart & Biggar
ATTORNEYS.

INVENTOR
NORMAN F. MOODY
BY- Smart & Biggar
ATTORNEYS

April 18, 1961 N. F. MOODY 2,980,805

TWO-STATE APPARATUS

Filed Feb. 11, 1957 3 Sheets-Sheet 3

INVENTOR
NORMAN F. MOODY
BY- Smart + Biggar
ATTORNEYS

United States Patent Office 2,980,805
Patented Apr. 18, 1961

2,980,805

TWO-STATE APPARATUS

Norman F. Moody, Ottawa, Ontario, Canada, assignor to Her Majesty the Queen in the right of Canada as represented by the Minister of National Defence Filed Feb. 11, 1957, Ser. No. 639,287

29 Claims. (Cl. 307—88.5)

Figures 1, 3, 6:
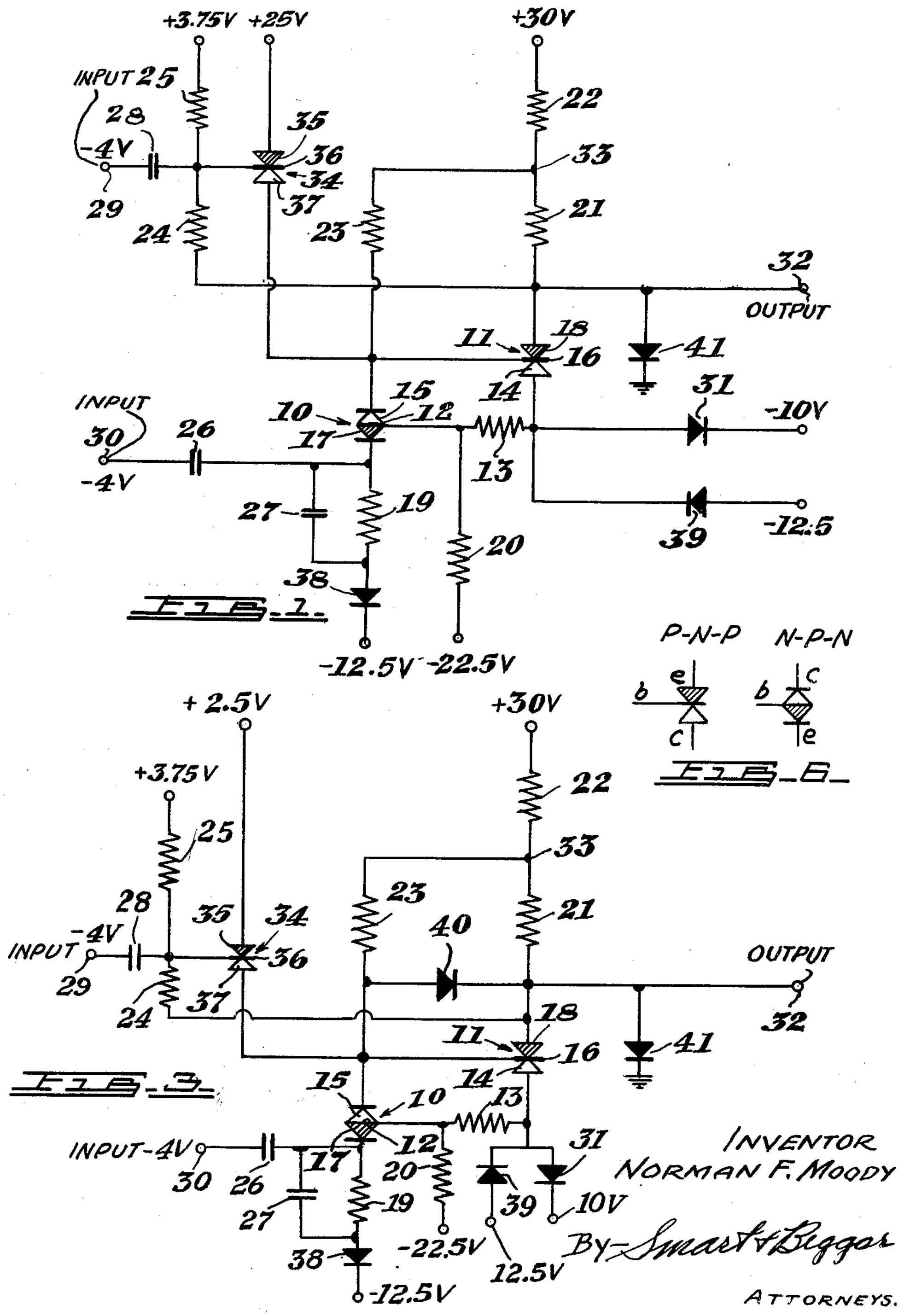

The invention relates to the circuits of two-state apparatus using junction transistors and, although the invention has application in various fields which require such circuits, reference will be made to its use in the digital computer field. Similar circuits are disclosed in applicants' United States patent application Serial No. 610,002, filed September 14, 1956, Patent No. 2,945,134, issued July 12, 1960.

Digital computer design may be based on the use of two-state circuits interconnected by passive routing circuits. The two-state circuits are active or power injecting devices while the routing circuits comprise diodes, resistors and condensers which simply interconnect the two-state circuits under command of instructions (machine logic). The two-state circuits may be tripped from one state to another by inpulses so that attention must be given to the wavefronts produced by two-state circuits as they make a transition from one state to the other. These wavefronts (pulse edges) must be sharp and must be capable of supplying considerable surge current because the logic may call upon one two-state circuit to feed several similar circuits. The transmission of a wavefront from a two-state circuit to others which are to be triggered may be done via small condensers (because only momentary impulses are required for the purpose), but in general the routing circuits will have direct current (D.C.) connections to the two-state circuits and will therefore absorb maintained currents of considerable value from the two-state circuits. In order that the two state circuits be readily adaptable to various uses they should have two separate input terminals, each excited with same polarity of drive pulse, one to set the circuit to the one state and the other to reset the circuit to the alternative state. In some cases it is also of advantages to have a pair of output waveforms.

Previous two-state apparatuses using transistors which were permitted to operate in a saturated or bottomed state suffered from the disadvantage that too long a period of time was required to clear the carriers from the transistors when the transistors were switched from a state of conduction to a cut-off state. In some circuits this disadvantage was overcome by preventing the transistors from reaching a saturated state. However, when this is done the maximum output load current which can be maintained is somewhat limited. The present invention provides a two-state apparatus, which is based on a new concept of controlled degree of saturation (described hereinafter), which can supply a large output current and which has a short resolving time.

The present invention provides a two-state apparatus comprising a junction type semiconductor unit having an emitter electrode, a first base electrode, a second base electrode, and a collector electrode; a first clamping means adapted to maintain the semiconductor unit in a cut-off state; a second clamping means adapted to maintain semiconductor unit in a state of conduction; and an input connection taken from at least one of the electrodes of the semiconductor unit for switching the semiconductor unit from one state to the other in response to an input signal. The first clamping means includes means adapted to clamp the collector electrode at a first predetermined potential when the semiconductor is in a cut-off state, and the second clamping means includes means adapted to clamp the collector electrode at a second predetermined potential when the semiconductor unit is in a state of conduction. The second clamping means also includes means adapted to clamp the current of the second base electrode at a value which is equal to the current of the emitter electrode multiplied by $\alpha_2$ and which is more than the current of the collector electrode multiplied by $(1-\alpha_1)$ where $\alpha_2$ is the current amplification factor of the second base electrode to the emitter electrode and $\alpha_1$ is the current amplification factor of the first base electrode to the collector electrode.

According to one embodiment of the invention, the semiconductor unit comprises a pair of complementary junction transistors; each of which includes an emitter, a base, and a collector; and the collector of each transistor is conected to the base of the other transistor. When the complementary transistors are interconnected in this way the emitter of one transistor forms an effective emitter electrode for the semiconductor unit and the emitter of the other transistor forms an effective collector electrode for the semiconductor unit.

The present invention is based on a new concept of controlled saturation which makes it possible to construct a two-state apparatus, employing a minimum of components and power supplies, which can supply a large output current and which has a relatively short resolving time. These features make the two-state apparatus of the present invention commercially attractive in such fields as the digital computer field. This new concept will now be described in relation to an n-p-n-p semiconductor unit consisting of two complementary transistors interconnected as described above.

When the n-p-n-p unit is in the on or conducting state, both transistors pass current. The addition of a load applied externally to the n-p-n-p unit will cause the current passed by one transistor or by both transistors to increase, dependent on the type or circuit chosen. In order to switch the n-p-n-p unit to the off state, the excitation must be removed from each of the transistors and, in order to minimize the time required to turn off the n-p-n-p unit, the turn-off mechanism must quickly clear the carriers from the base regions of the transistors.

The population of carriers stored within the base of a transistor is usually proportional to the transistor currents, and consequently it follows that it will be more difficult to turn the transistor off when the load demands large transistor currents. Another factor controlling the stored carrier population is the mode of operation of the transistor. In most circuit arrangements it is found that the carrier storage is at a minimum for any particular value of transistor current when the transistor is prevented from reaching a saturated state, that is when the potential of the collector of the transistor is sufficient to collect the fraction $\alpha$ of the carriers injected at the emitter (where $\alpha$ is the collector to emitter current gain and is defined as the ratio of the change in collector current to the change in emitter current for a constant collector voltage). In such circuit arrangements the carrier storage is greatly enhanced when the potential of the collector circuit is low enough that it restricts the collector current to values below this fraction $\alpha$ of the emitter current. The time required to switch a two-state apparatus from a state of conduction to a cut-off state will then be longer when the transistor is allowed to reach a saturated state because the turn-off mechanism will have to inject greater energy into the n-p-n-p unit to clear the carriers.

A measure of the carrier storage resulting from saturation may be deduced from the discussion given below. It will be seen that the saturation can be controlled by controlling one current so that the difficulties described above may be avoided.

The carrier storage in a non-saturated transistor is approximately proportional to the emitter current, since the emitter current is simply $$\frac{1}{1-\alpha}$$

times greater than the base current, the storage factor is also proportional to the base current.

If, now, the base current is maintained constant, but the emitter (or collector current), is forced to reduce by changes in the external circuit the transistor will saturate and the carrier population may change.

In a transistor of electrical symmetry, that is the parameters are the same when the roles of the emitter and collector are interchanged, then as the transistor goes into saturation the carrier population will remain constant.

In a transistor of the more usual asymmetrical construction, but in which the base is essentially field free, then it is found that the carrier storage tends to diminish as the transistor is more heavily saturated.

It is seen, therefore, that the maximum carrier population is set by the base current, and the presence of saturation is not expected to increase the carrier storage above its non-saturated value.

The present inventor has found in practice that when a transistor is operated at a constant base current, the carriers may be cleared in a relatively constant time, irrespective of whether the transistor is saturated or not. As discussed above the base current sets a limiting value to storage carriers, whether the transistor is saturated or not. These carriers represent a charge storage in the base, and consequently an upper limit has been set to the storage charge. In order to turn the transistor off in a given time it is only necessary to remove this charge in a given time. It is found in practice that the time required to remove this charge is little dependent on transistor saturation.

Figure 2:
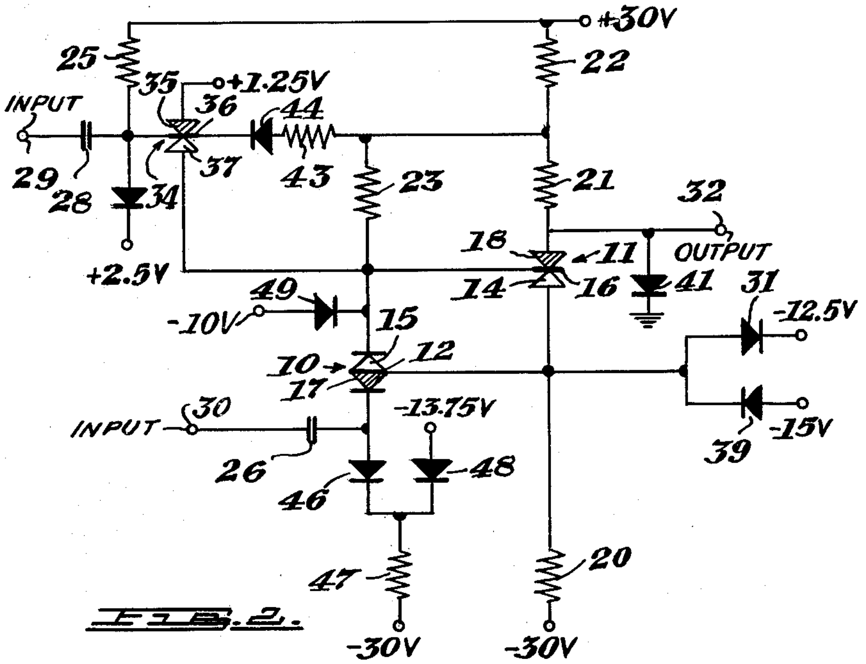
Figure 4:
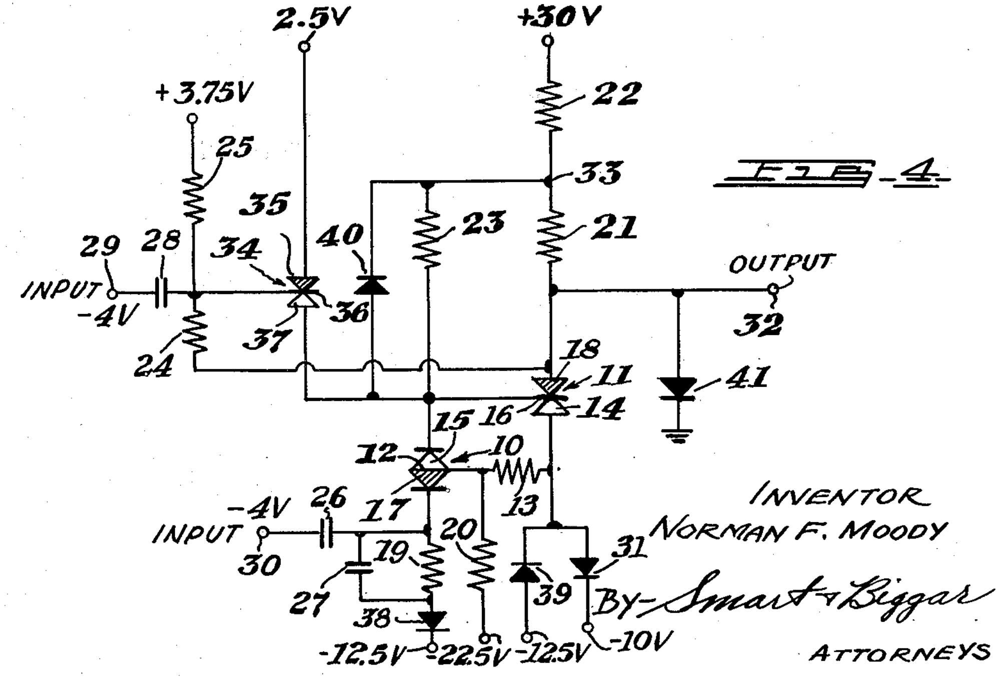
Figure 5:
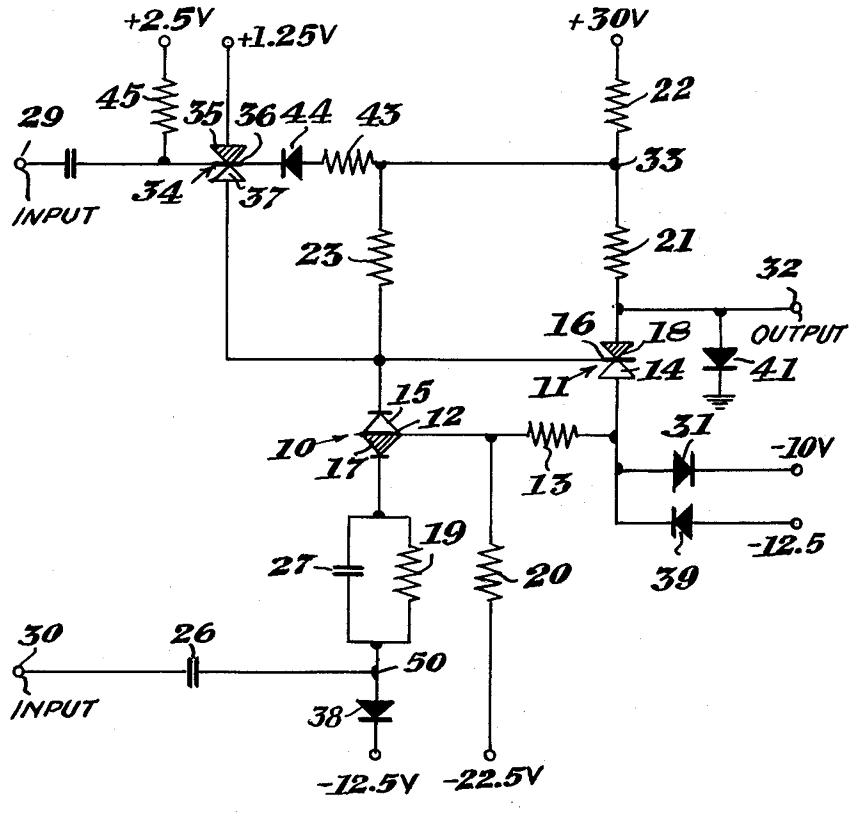

Some preferred embodiments of the invention will now be described with reference to the accompanying drawings in which, Figure 1 is a schematic circuit diagram illustrating one embodiment of the invention, Figure 2 is a schematic diagram illustrating an alternative embodiment of the invention, Figure 3 is a schematic circuit diagram illustrating a modification for the circuit of Figure 1, Figure 4 is a schematic circuit diagram illustrating a modification for the circuit of Figure 1, Figure 5 is a schematic circuit diagram of a further embodiment of the invention, and Figure 6 shows the symbols used for transistors in the drawings of this application.

A circuit based on the new concept of controlled degree of saturation is illustrated in Figure 1. A pair of complementary junction transistors 10 and 11 are interconnected to form an n-p-n-p semiconductor unit. The base 12 of the transistor 10 is connected through a resistor 13 to the collector 14 of the transistor 11 to form an effective first base electrode for the n-p-n-p unit, and the collector 15 of the transistor 10 is connected to the base 16 of the transistor 11 to form an effective second base electrode for the n-p-n-p unit. The emitter 17 of the transistor 10 forms an effective emitter electrode for the semiconductor unit and the emitter 18 of the transistor 11 forms an effective collector electrode for the semiconductor unit.

For the purpose of illustration, the components of the circuit illustrated in Figure 1 may have the following values:

Resistor 19=1500 ohms
Resistor 20=3900 ohms
Resistor 13=150 ohms
Resistor 21=390 ohms
Resistor 22=6800 ohms
Resistor 23=5600 ohms
Resistor 24=150,000 ohms
Resistor 25=10,000 ohms
Capacitor 26=100 micromicrofarads
Capacitor 27= 1,000 micromicrofarads
Capacitor 28=100 micromicrofarads The input signals at the input terminals 29 and 30 may be negative pulses of approximately 4 volts amplitude.

When the circuit of Figure 1 is in the on state, an emitter current of approximately 1.25 milliamperes will flow, this current being defined by the potential difference between the −10 volt power supply and the −12.5 volt power supply appearing across resistor 19. transistor 10 is prevented from reaching a saturated state by the voltage drop across resistor 13 which may be approximately 0.4 volt and consequently, the current withdrawn by the collector 15 of the transistor 10 is equal to $\alpha$ (1.25) milliamperes (where $\alpha$ is the collector to emitter current amplification factor for the transistor 10). The current withdrawn from the base 16 of the transistor 11 will be equal to this value less the constant current injected by the resistor 23. This base current may be approximately 0.85 milliampere.

The current drawn by the base 16 of the transistor 11 is constant irrespective of the output current load, which passes through the transistor 11 to the −10 volt power supply, because the transistor 11 will under all load conditions be saturated. This is so because the potential of the collector 14 of the transistor 11 is clamped at −10 volts by the conduction of diode 31 when the semiconductor unit is in the on state. The potential of the base 12 of the transistor 10 is defined with respect to this level by the voltage drop across the resistor 13, and consequently the base 12 is not affected by output load current. The potential of the emitter 18 and of the base 16 is also defined by this potential and is not affected by output load current. The potential of the common point 33 is defined by the relative values of the two resistors 21 and 22 connected between the emitter 18 of the transistor 11 and a +30 volt power supply, and in this example is approximately −7.8 volts. The potential of this point 33 is also independent of output load current. A resistor 23 is connected from the common point 33 between the two resistors 21 and 22 to the base 16 of the transistor 11 and the voltage difference across this resistor 23, which in this example is approximately 2.2 volts, injects a constant current of approximately 0.4 milliampere towards the base of transistor 11. The current of the base 16 is itself constant irrespective of the output load current because the current of the collector 15 of the transistor 10 is constant, the current injected by the resistor 23 is constant, and transistor 34 is cut off. The saturated transistor 11 then answers the criterion for controlled saturation.

The choice of a base current of the transistor 11 of 0.85 milliampere allows it to deliver a load current of $$\frac{1}{1-\alpha}$$

(0.85) milliampere at its emitter. If transistor 11 has an $\alpha$ of 0.975 it can then supply any load current up to approximately 35 milliamperes before it leaves the region of saturation. Approximately 5.5 milliamperes of this current is absorbed in resistors 21 and 22 so that load currents from 0–29 milliamperes are available externally.

The transistor 34 is employed in one of the input circuits to switch the semiconductor unit from a state of conduction to a cut-off state. When a negative pulse appears at the input terminal 29 capacitor 28 discharges through the emitter 35 of the transistor 34 and this transistor conducts and rapidly saturates. The base 16 of the transistor 11 is rapidly pulled positive with respect to both the emitter 18 and the collector 14 of the transistor 11 with the result that both the emitter and the collector of the transistor 11 act as collector electrodes and both assist in the clearing of carriers. Diodes 31 and 41 provide low impedance paths for the resulting currents.

The detrimental effects whch would normally occur because of the collector to base capacity of transistor 34 are largely overcome by the use of the resistors 24 and 25. The bias network, consisting of resistors 24 and 25, prevents the negative pulse of voltage that appears on the collector 37 of the transistor 34 when the structure is switched from a cut-off state to a state of conduction from momentarily firing the transistor 34 because the base 36 of transistor 34 is biased off by one volt and furthermore 100 microamperes of current must be delivered to it in order to overcome this bias. Capacitor 28, which in most cases is fed from a low impedance source, has a value of 100 micromicrofarads and a typical collector to base capacity for the transistor 34 is 9 micromicrofarads. Consequently only one twelfth of the voltage fall of the collector 37 can appear at the base 36 of the transistor 34, and this potential will not excite transistor 34 by a marginal amount. The current load imposed by the resistors 24 and 25, initially 100 microamperes but decreasing to 40 microamperes as the emitter 18 of the transistor 11 follows its base 16 downwardly reaching a final value of 40 microamperes, suffices to introduce a margin of safety.

When the structure is in a state of conduction the emitter 18 of transistor 11 has a potential of approximately −10 volts and the potential of the base 36 of the transistor 34 is defined by the relative values of resistors 24 and 25 which in this example is approximately 2.94 volts and represents a positive bias of only 0.44 volt with respect to its emitter 35. Consequently little of the charge applied to capacitor 28 is lost in overcoming positive base bias and furthermore little pulse voltage initially appears across the resistors 24 or 25, because the base to emitter path is of low impedance and, therefore, most of the input charge is delivered to the base 36 of the transistor 34.

Transistor 34 now draws current and the turn-off action commences. After approximately 0.5 microsecond saturation in transistor 11 ceases so that its base and emitter potentials rise. At approximately the same time the collector 14 falls as the carriers are cleared, whereupon transistor 10 is quickly cut off and the emitter 18 of transistor 11 rises to ground potential. The base 36 of the transistor 34 rises towards +3.5 volts by virtue of the voltage divider network consisting of resistors 24 and 25 and this increases the rate of discharge of capacitor 28 and also directs a sizable reverse base current towards transistor 34 (approximately 100 microamperes at its cut-off bias of +2.5 volts).

The carrier storage in transistor 34 is limited by the charge injected at this base by condenser 28. This is in the order of 400–1000 micromicrocoulombs. The relatively small reverse base current of transistor 34 can clear these carriers and recharge capacitor 28 in approximately 2 microseconds. This time sets the resolving time of the circuit because the circuit cannot be switched to the on state until transistor 34 has become quiescent. This time can be shortened by following the negative turn-off pulse with a positive pulse to assist in clearing the carriers of transistor 34 and recharging the capacitor 28. Where such a positive pulse can be provided immediately following the negative edge of the turn-off pulse, that is in approximately 0.25 microsecond, a resolving time of about one microsecond is obtainable.

The emitter 17 of the transistor 10 is connected through a resistor 19 and a diode 38 to a −12.5 volt power supply and this resistor is by-passed by a capacitor 27. In the absence of the capacitor 27 the triggering speed would be severely restricted by the low value of current injected into the emitter 17 of the transistor 12, and the ability of the circuit to charge capacitative loads would be severely restricted. However, it is this low value of current which results in small storage effects in transistor 11. The by-pass capacitor 27 allows a high transient current to flow at the instant of switching and so overcomes this limitation and yet preserves the low storage of carriers. In addition the capacitor 27 and the diode 38 provide a low impedance by-pass for any positive pulses appearing at the input terminal 30 which, if they appeared when the structure was in a state of conduction, could disturb the output waveform. The diode 39, connected between the collector 14 of the transistor 11 and a −12.5 volt power supply, conducts when the semiconductor unit is in a cut-off state and prevents an excessive negative potential from appearing on the base 12 of transistor 10 because of the −22.5 volt power supply which is connected through a resistor 20 to the base 12 of the transistor 10. The resistor 20 injects a steady current drain of several milliamperes into the semi-conductor unit, as is desirable to shut off the resistor 10 quickly at turn-off time. Its placement between the resistor 13 and the base 12 of the transistor 10 results in a bias existing across the resistor which is almost constant because the current injected by the resistor 21 is so much larger than the current of the base 16 of transistor 11.

The output impedance of the semiconductor unit is very low in the on state and approaches the forward impedance of the diode 31 for maintained direct current loads. Furthermore, the output waveform is quite free from ringing effects at the time when the semiconductor unit is turned on, because of the firm clamping employed.

If the transistors 10 and 11 are typical alloy junction transistors having an $\alpha$ (collector to emitter current amplification factor) of more than 0.975 and an $\alpha$ cut-off frequency of 5 megacycles, and if the circuit components of Figure 1 have the values listed above then the following typical performance is realized:

Output potential:
- "Off" state ____________ volts __ 0.0
- "On" state ____________ do ____ −10

Direct current load in "On" state milliamperes __ 0 to −15

Input pulse requirements:
- Turn "on" pulse ____________ volts __ −4 to −10
- Turn "off" pulse ____________ do ____ −4 to −10

| Output current (milliamperes) | Delay (Microseconds) | Wavefront (Microseconds) |
|---|---|---|
| −5 (resistive load) | 0.12 | 0.12 fall |
| −20 (resistive load) | 0.12 | 0.2 |
| −10 (resistive load+1,000 Micromicrofarads capacitive load) | 0.1 | 0.3 |

Pulse wavefront at turn on:

Resolving time (resistive load and any current within the D.C. current range):
- 6 volts inputs ____________ microseconds __ 2.7
- 10 volts inputs ____________ do ____ 3.7

Resolving time (as above, but with positive pulse to clear turnoff transistor):
- 6–10 volts inputs ____________ microseconds __ 1.2

It has been assumed in the foregoing discussions that the current of the emitter 17 of transistor 10 was load independent and if this is true the maximum direct current load which can be handled by this semiconductor unit is $$\frac{1}{1-\alpha}$$

of the current of the base 16 of the output transistor 11 (where $\alpha$ is the collector to emitter current gain of the transistor 10). For example described above this value is approximately 34 milliamperes. A transient load current occurring during the time when the on state is quiescent is limited to the sum of the stored carriers with a maximum value of 34 milliamperes. However, practically all of the load current traverses the diode 31 and there will always exist a voltage drop across it which is proportional to the load current. As a result, the potential of the base 12 of the transistor 10 will be raised as the load increases and the current injected at the emitter 17 of the transistor 10 will therefore increase proportionally. This second order effect, hitherto ignored, may be utilized to increase this injected current and consequently the current capacity of the circuit at high load currents. This effect of the second order effect may be increased by connecting a resistor (not shown in the drawings) in series with the diode 31 or by reducing the resistance of the resistor 19. If the resistance of the resistor 19 is reduced then the −12.5 volt power supply to which it is connected must also be reduced proportionally.

When the output load connected to the output terminal 32 is capacitive it may be recharged by way of the resistors 21 and 22 when the semiconductor unit is switched from a state of conduction to a cutoff state. In some cases the n-p-n-p unit may attain the off state before the driven or load circuit is ready to receive a subsequent negative waveform. This detrimental effect can be overcome by connecting a diode 40 (as illustrated in Figure 3) between the collector 37 of the transistor 34 and the output terminal 32. When the transistor 34 conducts, in response to an input pulse to its base 36, the base 16 of the transistor 11 rises towards the +2.5 volt power supply at a rate that is faster than the emitter 18 of the transistor 11 can follow, with the result that the diode 40 is biased in its forward direction and the transistor 34, can, therefore, contribute current to the output terminal. When the potential of the emitter 18 of the transistor 11 is restrained at its final level by the conduction of diode 41, the potential of the base 16 will be held slightly positive wtih respect to the potential of he emitter 18 because of the voltage drop across the diode 40.

The potential of the base 18 of the transistor 11 cannot be driven appreciatively above the potential of the emitter 18 because of this diode 40. Thus, although the driven or load circuit may make a quick recovery, the n-p-n-p unit itself will take longer in becoming quiescent. This short-coming can be overcome by modifying the circuit as shown in Figure 4, that is by connecting the diode 40 from the collector 37 of the transistor 34 to the common point 33 between the resistors 21 and 22 rather than to the emitter 18 of the transistor 11. This modification allows the potential of the base 16 of transistor 11 to be pulled a volt or two above the potential of the emitter 18 of the transistor 11 so that the emitter 18 can act as a collector to help clear the carriers from the transistor 11. In addition, when the circuit is modified in this manner the potentials appearing on the emitter 35 and base 36 of the transistor 34 may be made more positive to avoid bottoming of the transistor 34.

In some applications, such as in the digital computer field, where several two-state units are interconnected by appropriate routing circuits it is often desirable to maintain the emitter electrode of the semiconductor unit at a substantially constant potential. This is done in the circuit illustrated in Figure 2 where the bias for the emitter 17 of the transistor 10 is supplied through an alternative circuit. In this circuit the emitter 17 of the transistor 10 is connected through a diode 46 and a resistor 47 to a −30 volt power supply, and the common point between the diode 46 and resistor 47 is connected through a diode 48 to a −13.75 volt power supply. When the circuit is in the cut-off state diode 48 passes current and clamps the potential of the emitter 17 of the transistor 10 at −13.75 volts. The base 12 of this transistor is clamped at −15 volts by diode 39 when the circuit is in the cut-off state so that a cut-off bias of 1.25 volts exists between the base 12 and the emitter 17. When the n-p-n-p structure is in a state of conduction, and diode 46 is conducting, the common point between the diode 46 and resistor 47 can be raised slightly positive with respect to the −13.75 volt power supply. However, there is very little change in potential of the emitter 17 between the on and the off state and the current flowing in resistor 47 is substantially constant. In this circuit the second base electrode is firmly clamped at −10 volts when the n-p-n-p structure is in a state of conduction by the diode 49. The remaining clamping diodes of this circuit perform the same functions as the equivalent diodes discussed with reference to the circuit illustrated in Figure 1.

An alternative way of connecting the input terminal 30 to the n-p-n-p unit is illustrated in Figure 5 of the drawings. In the circuit illustrated in Figure 1 a capacitor 26 is connected directly between this input terminal 30 and the emitter 17 of the transistor 10, whereas in the circuit illustrated in Figure 5 the input connection is made through the capacitor 26 to the point 50. This does not alter the circuit operation appreciably.

For some purposes the value of capacitor 27 can now be reduced with the result that the initial in-rush of current when the n-p-n-p structure is turned on is reduced. When the n-p-n-p structure is to be turned off at a time shortly following the turn-on time the effects of this in-rush of current may still be present, and consequently this reduction makes more rapid switching possible. Reducing the value of capacitor 27, as compared to its value in the circuit illustrated in Figure 1, allows a similar reduction in the value of resistor 19 which in turn raises the current of the transistor 10 and the current of the base 16 of the output transistor 11, thereby allowing higher maintained load currents when the n-p-n-p unit is in a state of conduction.

The revolving time of the circuit illustrated in Figure 1 is ultimately limited by the time taken to clear the carriers from the turn-off transistor 34. The time required to clear the carriers from transistor 34 can be shortened by reducing the values of resistors 24 and 25 to increase the reverse current of the base 36 of the turn-off transistor 34, however, this reduction would result in a loss of turn-off signal, that is a loss of charge when capacitor 28 is discharged through transistor 34, and consequently a reduced turn-off sensitivity. These detrimental effects can be overcome in a manner illustrated in the circuit of Figure 5.

In the circuit illustrated in Figure 5 the resistor 24 has been deleted, as compared to the circuit of Figure 1, and the resistor 43 and diode 44 have been added. When the n-p-n-p unit is in the on state the diode 44 is cut off and the only loss of charge when the turn-off pulse is applied at the input terminal 29 is in the resistor 45. This situation is similar to that of the circuit of Figure 1 and consequently the sensitivity to the turn-off pulse is also similar. When the turn-off pulse is applied to the terminal 39 the transistor 34 conducts and raises the potential of the base 16 of the output transistor 11 and its emitter 18 will follow, in a manner described hereinbefore, until diode 44 commences conduction. This occurs when the emitter 16 of the turn-off transistor 11 has almost reached its final potential which in this case is ground and when the currents in transistors 10 and 11 have already greatly decayed.

As the emitter 18 of the turn-off transistor 11 completes its recovery the current in diode 44 increases to approximately two milliamperes which is some twenty times the reverse current which can be supplied by resistor 45 alone. In this manner, when the work of the turn-off transistor 34 is substantially completed, a rapid clearing signal is applied to the transistor 34 which will clear the carriers of this transistor quite quickly.

By way of example the components of the circuit illustrated in Figure 5 may have the following values:

Capacitor 26=100 micromicrofarads
Capacitor 27=500 micromicrofarads
Capacitor 28=100 micromicrofarads
Resistor 19=1,000 ohms
Resistor 13=150 ohms
Resistor 20=3,900 ohms
Resistor 21=820 ohms
Resistor 22=5,600 ohms
Resistor 23=8,000 ohms
Resistor 43=2,200 ohms
Resistor 45=10,000 ohms When the components of the circuit illustrated in Figure 5 have the values listed above, the following performance is obtained.

| | |
|---|---|
| Output potential: | |
| In the "Off" state ____ volts __ | 0 |
| In the "On" state ____ do __ | −10 |
| D.C. load in "On" state ___ milliamperes __ | 0 to −25 |
| Input pulse requirements: | |
| Turn "On" pulse ____ volts __ | −4 to −10 |
| Turn "Off" pulse ____ do __ | −4 to −10 |
| Pulse wavefront at turn on, the same as for the circuit of Figure 1. | |
| Resolving time (resistive load, and any value of load current within D.C. current range): | |
| 6 volts inputs ____ microseconds __ | 1.2 |
| 10 volts inputs ____ do __ | 1.4 |

As can be seen from the above list, the maintained direct current load in the on state can be very high in this circuit. The sensitivity to input pulses is substantially the same, and the resolving time for a resistive load is reduced, as compared to the circuit illustrated in Figure 1 of the drawings.

All of the circuits described in this disclosure can of course be modified to employ complementary transistors, that is each n-p-n transistor can be replaced by a p-n-p transistor and each p-n-p transistor can be replaced by a n-p-n transistor. A p-n-p-n unit may be substituted for the n-p-n-p unit in each of Figures 1, 2 and 5. When this is done the polarity of the appropriate power supplies and biasing means must be reversed and the circuit resulting will operate in the same manner as described hereinbefore, but will provide output signals of opposite polarity to the output signals of the circuits illustrated in the drawings.

What I claim as my invention is:

1. A two-state apparatus having at least one output connection and at least one input connection, said apparatus comprising a junction type semi-conductor unit having an effective emitter electrode, an effective first base electrode, an effective second base electrode, and an effective collector electrode; a source of fixed potential, means connecting the first base electrode to one terminal of the source, first means connecting the effective collector electrode to the other terminal of the source, an output connection connected to the effective collector electrode, a first clamping means adapted to maintain the semiconductor unit in a cut-off state; a second clamping means adapted to maintain the semiconductor unit in a state of conduction; the first clamping means including second means connecting the second base electrode to a source of fixed potential to maintain the semiconductive unit in a cut-off state and to clamp the effective collector electrode at a first predetermined potential, the second clamping means including third means connecting the second base electrode to a point of potential on said source which is fixed upon conduction of the semi-conductive unit in a state of saturation to clamp the effective collector electrode at a second predetermined potential and to clamp the current drawn by the second base electrode despite variation in the load, at a value which is equal to the current of the effective emitter electrode multiplied by $\alpha_2$ and which is more than the current of the effective collector electrode multiplied by $(1-\alpha_1)$, where $\alpha_2$ is the current amplification factor of the second base electrode to the emitter electrode and $\alpha_1$ is the current amplification factor of the first base electrode to the collector electrode; an input connection taken from at least one of the electrodes of the semiconductor unit for switching the semiconductor unit from one state to the other state in response to an input signal to render the first and second clamping means selectively operable.

2. An apparatus as claimed in claim 1, in which the semi-conductor unit comprises a pair of complementary junction transistors; each of the transistors including an emitter, a base, and a collector; the collector of each transistor being connected to the base of the other transistor to form first and second base electrodes; whereby the emitter of one transistor forms an effective emitter electrode for said semiconductor unit, and the emitter of the other transistor forms an effective collector electrode for said semiconductor unit.

3. Apparatus as claimed in claim 1, comprising a first input connection taken from said second base electrode for switching the semi-conductor unit from a state of conduction to a cut-off state in response to an input signal, a second input connection taken from said effective emitter electrode for switching the semiconductor unit from a cut-off state to a state of conduction in response to an input signal, the input signals being pulses of the same polarity.

4. Apparatus as claimed in claim 1, comprising a capacitor and a diode series connected in that order from the effective emitter electrode to a source of predetermined protential, a resistor connected in parallel with the capacitor, the diode connected to the capacitor being adapted to pass current when the semiconductor unit is in a state of conduction, and an input connection taken from a common point between the series connected capacitor and diode to switch the semiconductor unit from the cut-off state to the state of conduction in response to an input signal.

5. Apparatus as claimed in claim 1, the first means comprising a first and a second resistor series connected between the effective collector electrode and the source of fixed potential, the first resistor being connected to said effective collector electrode and having a resistance that is small compared to the second resistor, the third means comprising a third resistor connected between a common point between the first and second resistor and said second base electrode, whereby a constant current of predetermined value is injected into said second base electrode when the semiconductor unit is in a state of conduction.

6. Apparatus as claimed in claim 1, wherein the first base electrode is connected through a resistor and a diode to a source of predetermined potential to apply a cut-off bias to the base with respect to the effective emitter electrode when the semiconductor unit is in a cut-off state.

7. Apparatus as claimed in claim 1, wherein said first clamping means includes a first diode connected between said effective collector electrode and an intermediate point of potential of the source of fixed potential to pass current when the semiconductor unit is in a cut-off state, and a second diode reversely connected from said first base electrode to a second source of predetermined potential to pass current when the semiconductor unit is in a cut-off state.

8. Apparatus as claimed in claim 1, wherein the second clamping means includes a diode connected between said second base electrode and the other terminal to clamp said second base electrode at the second predetermined potential when the semiconductor unit is in a state of conduction.

9. Apparatus as claimed in claim 1, comprising a first diode and a resistor series connected between said effective emitter electrode and a source of predetermined potential to pass current when the semiconductor unit is in a state of conduction, said first clamping means including a second diode reversely connected between said first diode and a source of predetermined potential to clamp said effective emitter electrode at a predetermined potential when the semiconductor unit is in a cut-off state, and an input connection taken from said emitter electrode to switch the semiconductor unit from a cut-off state to a state of conduction in response to an input signal.

10. Apparatus as claimed in claim 1, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit.

11. Apparatus as claimed in claim 1, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; a first resistor connected from said effective collector electrode to the base of the turn-off transistor; a second resistor connected from the base of the turn-off transistor to a source of predetermined potential; the first resistor having a high resistance compared to the forward emitter to base impedance of the turn-off transistor.

12. Apparatus as claimed in claim 1, comprising a resistor and a diode series connected between said effective emitter electrode and a source of predetermined potential to pass current when the semiconductor unit is in a state of conduction, a capacitor connected in parallel with the resistor connected to the effective emitter electrode, the second means comprising a first input connection taken from said second base electrode for switching the semiconductor unit from a state of conduction to a cut-off state in response to an input signal, a second input connection taken from said effective emitter electrode for switching the semiconductor unit from a cut-off state to a state of conduction in response to an input signal, the input signals being pulses of the same polarity.

13. Apparatus as claimed in claim 1, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; a diode connected between the collector of the turn-off transistor and the effective collector electrode to pass current when the semiconductor unit is switched from a state of conduction to a cut-off state.

14. Apparatus as claimed in claim 1, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; the first means comprising a first and a second resistor series connected between the effective collector electrode and the source of fixed potential, the first resistor being connected to said effective collector electrode and having a resistance that is small compared to the second resistor, the third means including a third resistor connected between a common point between the first and second resistor and said second base electrode, whereby a constant current of predetermined value is injected into said second base electrode when the semiconductor unit is in a state of conduction; and a diode connected between the collector of the turn-off transistor and said common point to pass current to the output connection when the semiconductor unit is switched from a state of conduction to a cut-off state.

15. Apparatus as claimed in claim 1, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; the first means comprising a first and a second resistor series connected between the effective collector electrode and the source of fixed potential, the first resistor being connected to said effective collector electrode and having a resistance that is small compared to the second resistor, the third means comprising a third resistor connected between a common point between the first and second resistor and said second base electrode, whereby a constant current of predetermined value is injected into said second base electrode when the semiconductor unit is in a state of conduction; and a diode connected between the base of the turn-off transistor and said common point to pass electron current to the output connection when the semiconductor unit is switched from a state of conduction to a cut-off state.

16. Apparatus as claimed in claim 2, comprising a resistor connected between the base of said one transistor and the collector of said other transistor.

17. Apparatus as claimed in claim 2, the second means comprising a first input connection taken from said second base electrode for switching the semiconductor unit from a state of conduction to a cut-off state in response to an input signal, a second input connection taken from said emitter electrode for switching the semiconductor unit from a cut-off state to a state of conduction in response to an input signal, the input signals being pulses of the same polarity.

18. Apparatus as claimed in claim 2, comprising a capacitor and a diode series connected in that order from the effective emitter electrode to a source of predetermined potential, a resistor connected in parallel with the capacitor, the diode connected to the capacitor being adapted to pass current when the semiconductor unit is in a state of conduction and an input connection taken from a common point between the series connected capacitor and diode to switch the semiconductor unit from the cut-off state to the state of conduction in response to an input signal.

19. Apparatus as claimed in claim 2, the first means comprising a first and a second resistor series connected between the effective collector electrode and the source of fixed potential, the first resistor being connected to said effective collector electrode and having a resistance that is small compared to the second resistor, the third means comprising a third resistor connected between a common point between the first and second resistor and said second base electrode, whereby a constant current of predetermined value is injected into said second base electrode when the semiconductor unit is in a state of conduction.

20. Apparatus as claimed in claim 2, wherein the first base electrode is connected through a resistor and a diode to a source of predetermined potential to apply a cut-off bias to the base with respect to the effective emitter electrode of said one transistor when the semiconductor unit is in a cut-off state.

21. Apparatus as claimed in claim 2, wherein said first clamping means includes a first diode connected between said effective collector electrode and an intermediate point of potential on said source to pass current when the semiconductor unit is in a cut-off state, and a second diode reversely connected from said first base electrode to a second source of predetermined potential to pass current when the semiconductor unit is in a cut-off state.

22. Apparatus as claimed in claim 2, wherein the second clamping means includes a diode connected between said second base electrode and a further source of potential to clamp said second base electrode at the second predetermined potential when the semiconductor unit is in a state of conduction.

23. Apparatus as claimed in claim 2, comprising a first diode and a resistor series connected between said effective emitter electrode and a source of predetermined potential to pass current when the semiconductor unit is in a state of conduction, said first clamping means including a second diode reversely connected between said first diode and a source of predetermined potential to clamp said effective emitter electrode at a predetermined potential when the semiconductor unit is in a cut-off state, and an input connection taken from said effective emitter electrode to switch the semiconductor unit from a cut-off state to a state of conduction in response to an input signal.

24. Apparatus as claimed in claim 2, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit.

25. Apparatus as claimed in claim 2, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; a first resistor connected from said effective collector electrode to the base of the turn-off transistor; a second resistor connected from the base of the turn-off transistor to a source of predetermined potential; the first resistor having a high resistance compared to the forward emitter to base impedance of the turn-off transistor.

26. Apparatus as claimed in claim 2, comprising a resistor and a diode series connected between said effective emitter electrode and a source of predetermined potential to pass current when the semiconductor unit is in a state of conduction, a capacitor connected in parallel with the resistor connected to the effective emitter electrode, the second means comprising a first input connection taken from said second base electrode for switching the semiconductor unit from a state of conduction to a cut-off state in response to an input signal, a second input connection taken from said effective emitter electrode for switching the semiconductor unit from a cut-off state to a state of conduction in response to an input signal, the input signals being pulses of the same polarity.

27. Apparatus as claimed in claim 2, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; a diode connected between the collector of the turn-off transistor and the effective collector electrode to pass current when the semiconductor unit is switched from a state of conduction to a cut-off state.

28. Apparatus as claimed in claim 2, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and a source of predetermined potential to pass current in response to an input signal to its base to clear carriers from said semiconductor unit; the first means comprising a first and a second resistor series connected between the effective collector electrode and the source of fixed potential, the first resistor being connected to said effective collector electrode and having a resistance that is small compared to the second resistor, the third means comprising a third resistor connected between a common point between the first and second resistor and said second base electrode, whereby a constant current of predetermined value is injected into said second base electrode when the semiconductor unit is in a state of conduction; and a diode connected between the collector of the turn-off transistor and said output connection to pass current to the output connection when the semiconductor unit is switched from a state of conduction to a cut-off state.

29. Apparatus as claimed in claim 2, the second means comprising a first input connection taken from said second base electrode for switching the semiconductor unit from a state of conduction to a cut-off state in response to an input signal; a second input connection taken from said effective emitter electrode for switching the semiconductor unit from a cut-off state to a state of conduction in response to an input signal; the input signals being pulses of the same polarity; the first input connection including a turn-off transistor having a base, an emitter, and a collector; the turn-off transistor being connected between said second base electrode and source of predetermined potential to pass current in response to an input signal to its base to clear carriers from said semiconductor unit; the first means comprising a first and a second resistor series connected between the effective collector electrode and the source of fixed potential, the first resistor being connected to said effective collector electrode and having a resistance that is small compared to the second resistor, the third means comprising a third resistor connected between a common point between the first and second resistor and said second base electrode, whereby a constant current of predetermined value is injected into said second base electrode when the semiconductor unit is in a state of conduction; and a diode connected between the base of the turn-off transistor and said common point to pass electron current to the output connection when the semiconductor unit is switched from a state of conduction to a cut-off state.

References Cited in the file of this patent

UNITED STATES PATENTS

| | | |
|---|---|---|
| 2,655,609 | Shockley | Oct. 13, 1953 |
| 2,655,610 | Ebers | Oct. 13, 1953 |
| 2,724,061 | Emery | Nov. 15, 1956 |
| 2,770,732 | Chong | Nov. 13, 1956 |
| 2,838,617 | Tummers | June 10, 1958 |
| 2,864,062 | Schaffner | Dec. 9, 1958 |

FOREIGN PATENTS

| | | |
|---|---|---|
| 203,364 | Australia | Sept. 13, 1956 |
| 1,110,585 | France | Oct. 12, 1955 |

OTHER REFERENCES

"The Transistor Regenerative Amplifier As A Computer Elements," by Chaplin, October 1954, Proceedings of the IEE, vol. 101 part III, No. 73.